United States Patent
Mori et al.

(10) Patent No.: US 8,413,757 B2
(45) Date of Patent: Apr. 9, 2013

(54) MOTORCYCLE ENGINE

(75) Inventors: Hidemichi Mori, Wako (JP); Kazuhisa Takemoto, Wako (JP); Tomio Onosato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 434 days.

(21) Appl. No.: 12/725,054

(22) Filed: Mar. 16, 2010

(65) Prior Publication Data

US 2010/0243365 A1 Sep. 30, 2010

(30) Foreign Application Priority Data

Mar. 30, 2009 (JP) .................................. 2009-081652

(51) Int. Cl.
*B60K 5/00* (2006.01)
*B60K 13/04* (2006.01)

(52) U.S. Cl. ........................... 180/292; 180/219; 180/296

(58) Field of Classification Search .................. 180/218, 180/219, 230, 292, 296
See application file for complete search history.

(56) References Cited

U.S. PATENT DOCUMENTS

| 4,359,865 | A | * | 11/1982 | Nakao et al. ..................... 60/313 |
| 4,828,069 | A | * | 5/1989 | Hatsuyama .................... 180/219 |
| 8,051,939 | B2 | * | 11/2011 | Kondo et al. .................. 180/219 |
| 2002/0000340 | A1 | * | 1/2002 | Laimbock ..................... 180/219 |
| 2002/0003056 | A1 | * | 1/2002 | Coughlin et al. .............. 180/219 |
| 2003/0217884 | A1 | * | 11/2003 | Kawamoto ..................... 180/292 |
| 2008/0110687 | A1 | * | 5/2008 | Miyashiro et al. ............. 180/296 |

FOREIGN PATENT DOCUMENTS

JP 60045428 A * 3/1985
JP 2008-207788 11/2008

* cited by examiner

*Primary Examiner* — J. Allen Shriver, II
*Assistant Examiner* — Bridget Avery
(74) *Attorney, Agent, or Firm* — Squire Sanders (US) LLP

(57) ABSTRACT

A motorcycle is provided that includes intake system parts connected to a front side of a cylinder of an engine, and exhaust system parts connected to the rear side of the cylinder. The cylinder is inclined rearward, and the intake system parts are disposed forward and upward of the cylinder. A cylinder axial line C of the cylinder passes rearward of the motorcycle with respect to a lowermost portion of a seating face of a seat, as viewed in a side elevation of the motorcycle.

6 Claims, 3 Drawing Sheets

MOTORCYCLE ENGINE

FIELD

Embodiments of the invention relate to a motorcycle, and more particularly to an engine for a motorcycle.

DESCRIPTION OF RELATED ART

Conventionally, a motorcycle includes a vertically disposed rear cushion and a single-cylinder engine, whereby the engine includes a rearwardly inclined cylinder (see Japanese Patent Laid-Open No. 2008-207788 ["JP 207788"]).

While, in a motorcycle, lower disposition of the center of gravity and concentration of the mass of the motorcycle is desired, as described for the motorcycle in JP-207788, the cylinder axial line of the cylinder is disposed so as to pass forwardly of the seat. Therefore, the height of the camshaft of the engine becomes high, making it more difficult to have a lower disposition of the center of gravity of the motorcycle.

SUMMARY

In view of the situation as described above, embodiments of the invention provide for a motorcycle that can achieve lower disposition of the center of gravity and concentration of the mass of the motorcycle.

In accordance with one embodiment of the invention, there is provided a motorcycle including an engine disposed between a front wheel and a rear wheel, an intake system part connected to the front side of a cylinder of the engine, and an exhaust system part connected to the rear side of the cylinder. The cylinder can be inclined in the rear of the motorcycle, and the intake system part can be disposed forward and upward the cylinder. A cylinder axial line of the cylinder can pass rearward of the vehicle with respect to a lowermost portion of a seating face of a seat as viewed in a side elevation of the motorcycle.

In accordance with another embodiment of the invention, there is provided a motorcycle. The motorcycle can include engine means for driving said motorcycle. The engine means can be disposed between a front wheel and a rear wheel. The motorcycle can further include intake system means for receiving air. The intake system means can be connected to a front side of a cylinder of the engine means. Further, the motorcycle can include exhaust system means for discharging exhaust. The exhaust system means being connected to a rear side of the cylinder. The cylinder can be inclined rearward. The intake system means can be disposed forward and upward of said cylinder. A cylinder axial line of the cylinder can pass rearward of the motorcycle with respect to a lowermost portion of a seating face of a seat as viewed in a side elevation of the motorcycle.

In accordance with another embodiment of the invention, an upper face of a cylinder head cover of the engine can be disposed in an opposing relationship to a rear cushion.

In accordance with another embodiment of the invention, the engine can be a single overhead camshaft (SOHC) engine, whereby an intake valve can be directly driven by a cam and an exhaust valve can be driven by a rocker arm.

In accordance with another embodiment of the invention, the engine can include a crankcase configured to accommodate a change gear. The cam can be disposed between a main shaft and a countershaft of the change gear as viewed in a side elevation of the motorcycle.

As a result of certain embodiments, the cylinder can be inclined to the rear of the motorcycle, the intake system part can be disposed forward and upward the cylinder, and the cylinder axial line of the cylinder can pass rearward of the vehicle with respect to the lowermost portion of the seating face of the seat as viewed in a side elevation of the vehicle. Therefore, the height of the cylinder head can be made lower, and therefore, lower disposition of the center of gravity of the motorcycle can be achieved. Further, since the seated position and the position of the center of gravity of the engine can be set nearer to each other, concentration of the mass of the motorcycle can be achieved.

As a result of certain embodiments, since the upper face of the cylinder head cover of the engine is disposed in an opposing relationship to the rear cushion, the rear cushion and the position of the center of gravity of the engine can be set nearer to each other. Therefore, further concentration of the mass of the motorcycle can be achieved.

In accordance with certain embodiments, since the engine is an SOHC engine, whereby an intake valve can be directly driven by a cam and an exhaust valve can be driven by a rocker arm, the cylinder head cover on the exhaust valve side can be reduced in size. Consequently, since the cylinder head cover can be positioned closer to the rear cushion, the rearward inclination angle of the cylinder can be made greater.

As a result of certain embodiments, since the change gear can be accommodated in the crankcase of the engine and the cam can be disposed between the main shaft and the countershaft of the change gear as viewed in a side elevation of the vehicle, the change gear, cylinder, and cylinder head can be disposed closely to each other. Therefore, further concentration of the mass of the motorcycle can be achieved.

DETAILED DESCRIPTION OF EMBODIMENTS

Figure 1:
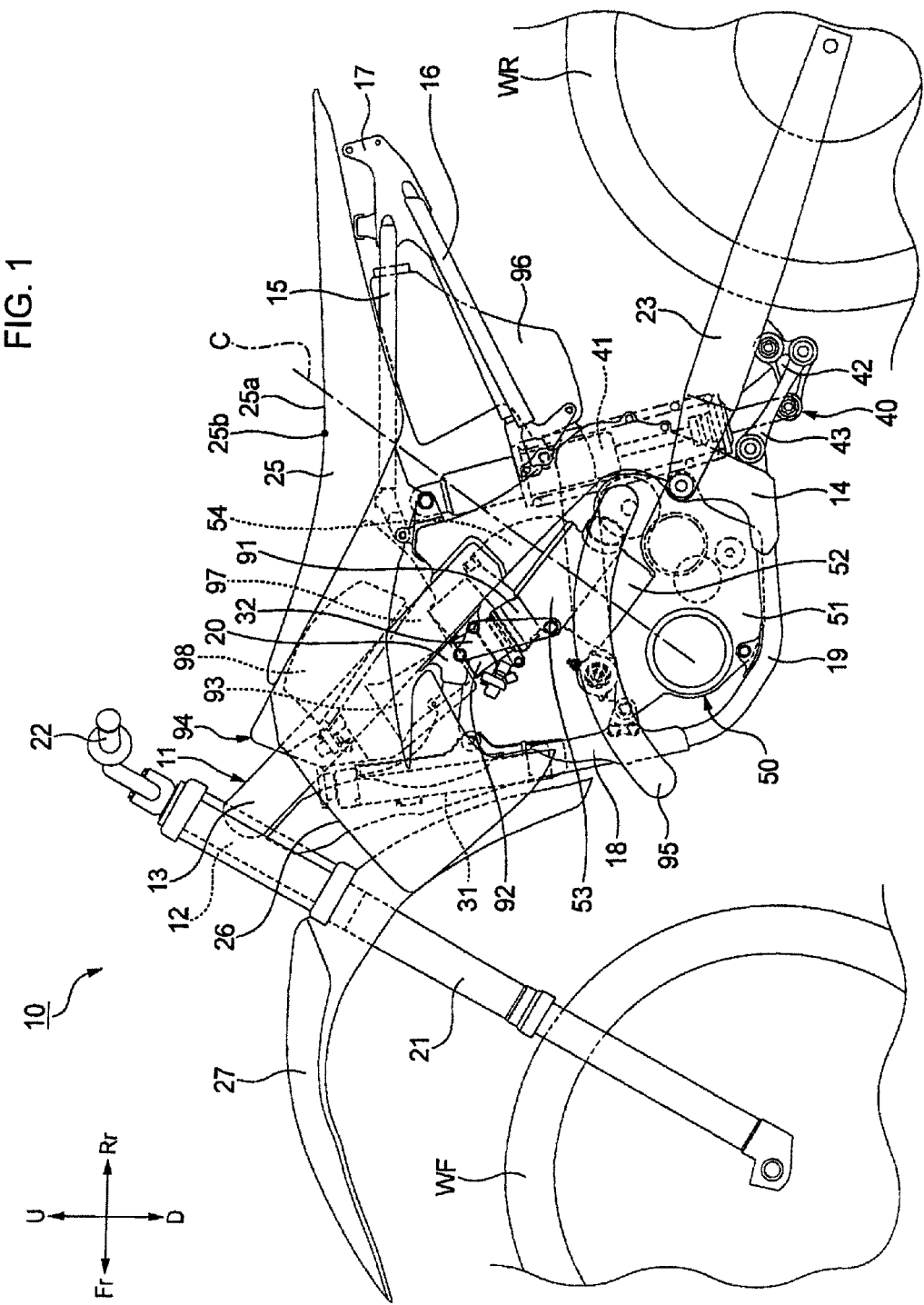
FIG. 1 is a left side elevation view of a motorcycle, in accordance with an embodiment of the invention.

An embodiment of a motorcycle in accordance with the invention is described in detail with reference to the drawings. It is to be noted that the drawings should be viewed in the direction of reference characters, and in the following description, the forward, rearward, leftward, rightward, upward and downward directions are those as viewed from a driver. Further, in the drawings, the front side of the vehicle is denoted by Fr, the rear side by Rr, the left side by L, the right side by R, the upper side by U, and the lower side by D.

As illustrated in FIG. 1, the motorcycle 10 can include a vehicle body frame 11 that can include a head pipe 12 provided at the front end, a pair of left and right main frames 13 branched to the left and right from the head pipe 12 and extending rearward and downward, a pair of left and right pivot frames 14 connected to rear end portions of the main frames 13 and extending downward, and a pair of left and right rear frames 15 connected to upper end portions of the pivot frames 14 and extending rearward. The vehicle body frame 11 can further include a pair of left and right sub frames 16 connected to intermediate portions of the pivot frames 14 and extending rearward and upward, a rear bracket 17 to which rear end portions of the pair of left and right rear frames 15 and the pair of left and right sub frames 16 are connected, and a pair of left and right down frames 18 extending downward from the head pipe 12. Further, the vehicle body frame 11 can include a bottom frame 19 for connecting lower end portions of the down frames 18 and lower end portions of the pivot frames 14 to each other, and a pair of left and right engine supporting frames 20 for connecting intermediate portions of the down frames 18 and rear portions of the main frames 13 to each other. An engine 50 can be suspended on the down frames 18, bottom frame 19, and engine supporting frames 20.

Further, according to an embodiment of the invention, the motorcycle 10, as illustrated in FIG. 1, can include a front fork 21 supported for steering movement on the head pipe 12, a front wheel WF supported for rotation at a lower end portion of the front fork 21, and a steering bar handle 22 mounted at an upper end portion of the front fork 21. The motorcycle 10 can further include a swing arm 23 supported for rocking motion on the pivot frames 14, a rear wheel WR supported for rotation at a rear end portion of the swing arm 23, a rear wheel suspension apparatus 40 for suspending the swing arm 23 on the pivot frames 14, and a seat 25 mounted upward of the rear frames 15. As further illustrated in FIG. 1, reference numeral 26 denotes a shroud for sideward covering of the main frames 13 and the down frames 18, and reference numeral 27 denotes a front fender for covering the front wheel WF.

As further illustrated in FIG. 1, the rear wheel suspension apparatus 40 can include a rear cushion 41 mounted at an upper end portion thereof for rocking motion at upper end portions of the pivot frames 14, a first link 42 including a substantially triangular shape for connecting a lower end portion of the rear cushion 41 and a lower side intermediate portion of the swing arm 23 for rocking motion relative to each other. The rear wheel suspension apparatus 40 can further include a second link 43 for connecting the first link 42 and lower end portions of the pivot frames 14 for rocking motion relative to each other.

Figure 2:
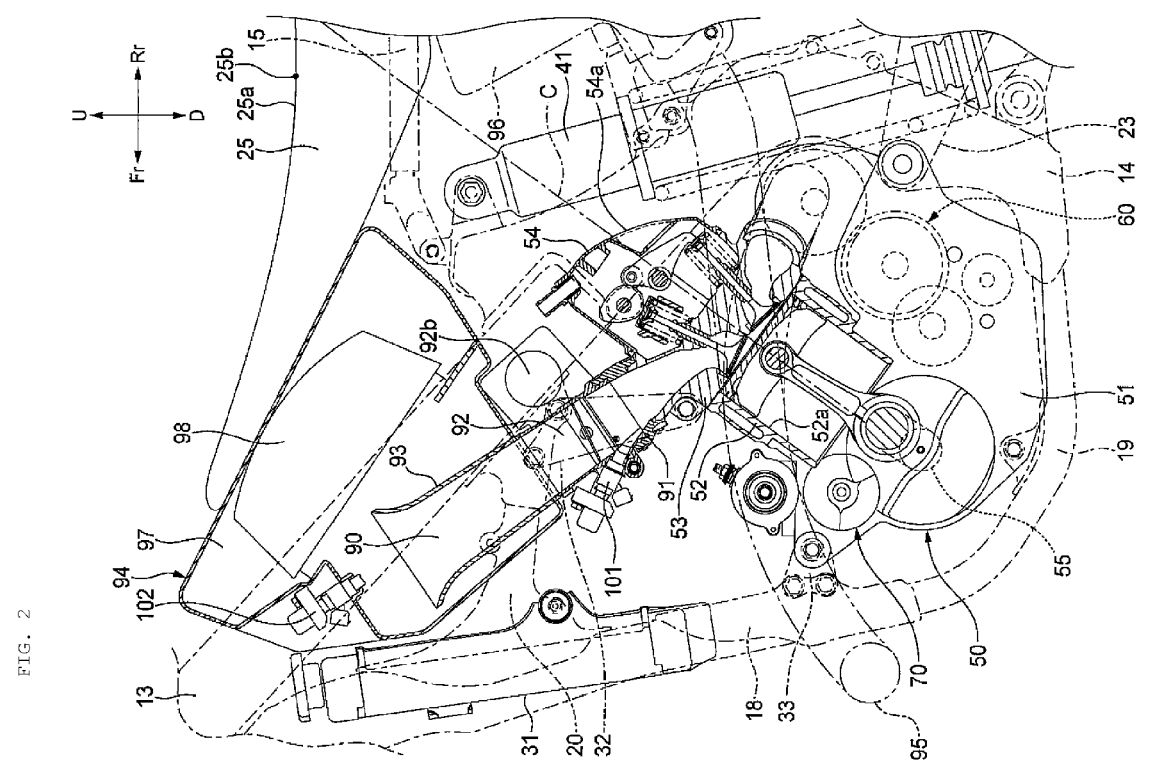
FIG. 2 is a left side elevation view of peripheral elements of an engine illustrated in FIG. 1, in accordance with an embodiment of the invention.
Figure 3:
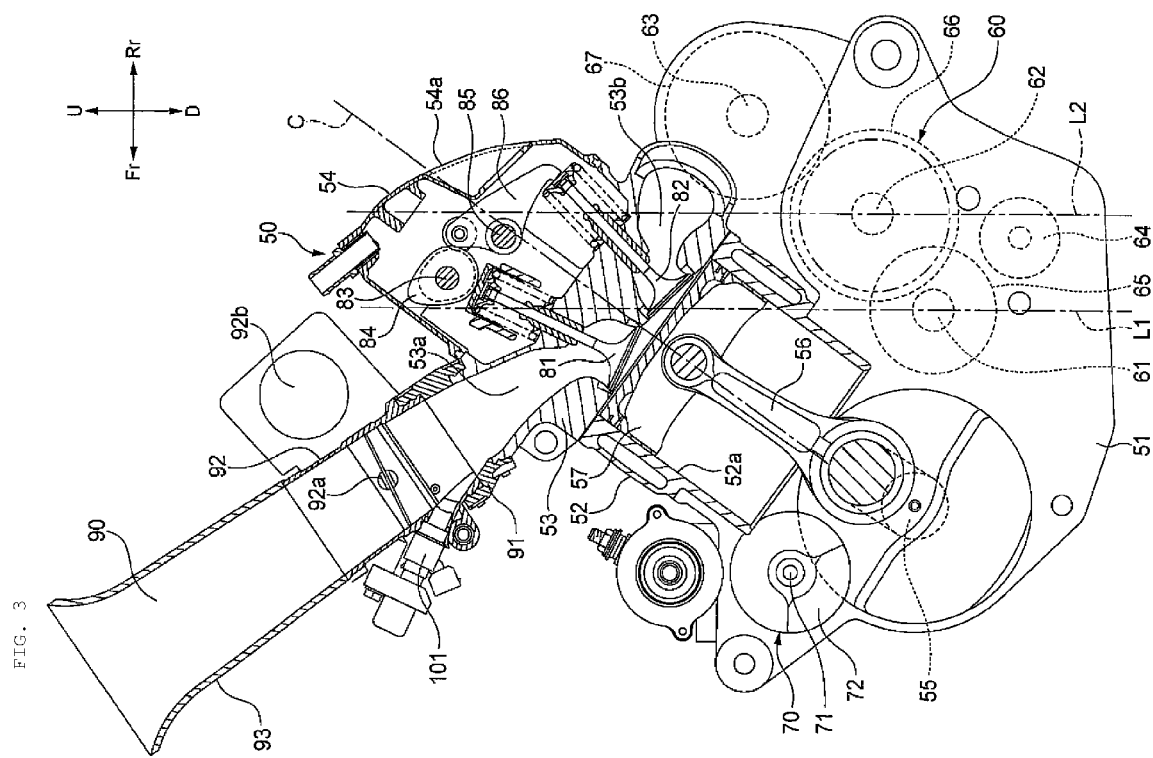
FIG. 3 is a left side elevation view of the engine illustrated in FIG. 2, in accordance with an embodiment of the invention.

The engine 50 can be, for example, a water-cooled type, single-cylinder engine. As illustrated in FIGS. 2 and 3, a shell of the engine 50 can include a crankcase 51, a cylinder block 52 mounted at a front upper end portion of the crankcase 51, a cylinder head 53 mounted at an upper end portion of the cylinder block 52, and a cylinder head cover 54 for covering an upper opening of the cylinder head 53. Further, a radiator 31 for cooling the cooling water, which circulates in the engine 50, can be mounted on the down frames 18 disposed forward of the engine 50.

Further, as illustrated in FIG. 2, the engine 50 can be suspended by bolt fastening at an intermediate location along with an engine hanger plate 32 bolt-fastened to a rear portion of the engine supporting frames 20, and an engine hanger plate 33 bolt-fastened to a lower end portion of the down frames 18 and the bottom frame 19. The engine can be disposed between the front wheel WF and the rear wheel WR.

Further, as illustrated in FIG. 3, a crankshaft 55 can be supported for rotation on the crankcase 51, and a piston 57 can be connected to the crankshaft 55 through a connecting rod 56. The piston 57 carries out reciprocating motion in a cylinder axial line C direction in a cylinder 52a of the cylinder block 52. Further, in accordance with an embodiment of the invention, the cylinder axial line C can be disposed in a rearward and inclined relationship on the rear of the motorcycle.

Further, a change gear 60 can be accommodated in a rear portion of the crankcase 51, and can include a main shaft 61, a counter shaft 62 supported for rotation on the crankcase 51, and a kick shaft 63 for kick starting the motorcycle 10. The crankcase 51 can further include a shift drum 64, a plurality of driving gears 65 provided on the axis of the main shaft 61, a plurality of driven gears 66 provided on the axis of the counter shaft 62 for meshing with the plural driving gears 65, and a kick gear 67 provided on the axis of the kick shaft 63 and for meshing with the driven gears 66.

Further, a balancer 70 can be accommodated in a front portion of the crankcase 51, and can include a balancer shaft 71 supported for rotation on the crankcase 51 and a balance weight 72 provided on the balancer shaft 71. Further, the balancer 70 can be driven to rotate by driving force of the crankshaft 55.

As further illustrated in FIG. 3, the cylinder head 53 can include an intake valve 81 for opening and closing an intake port 53a formed on the front face of the cylinder head 53, and an exhaust valve 82 for opening and closing an exhaust port 53b formed on the rear face of the cylinder head 53. The cylinder head 53 can further include a camshaft 83 supported for rotation on the cylinder head 53, a cam 84 provided on the camshaft 83, a rocker shaft 85 provided on the cylinder head 53, and a rocker arm 86 supported coaxially for rocking motion on the rocker shaft 85 and rocked by the cam 84. The intake valve 81 can be directly driven by the cam 84 and the exhaust valve 82 can be driven by the rocker arm 86. In other words, the engine 50 can be an SOHC engine.

Further, as illustrated in FIGS. 2 and 3, a throttle body 92 can be connected to the intake port 53a of the cylinder head 53 through a connecting pipe 91. An air cleaner 94 can be connected to an upstream end of the throttle body 92 through an intake pipe 93. Further, in accordance with an embodiment of the invention, the connecting pipe 91, throttle body 92, intake pipe 93, and air cleaner 94 are intake system parts and can be disposed forward and upward of the cylinder block 52. Further, in accordance with an embodiment of the invention, the connecting pipe 91, throttle body 92, and intake pipe 93 can form an intake path 90.

Further, as illustrated in FIG. 2, a muffler 96 can be connected to the exhaust port 53b of the cylinder head 53 through an exhaust pipe 95. Further, in accordance with an embodiment of the invention, the exhaust pipe 95 and the muffler 96 are exhaust system parts.

The throttle body 92 can include a throttle valve 92a for opening and closing the intake path 90, a controlling motor 92b for controlling the degree of the opening of the throttle valve 92a, and a first injector 101 for injecting fuel to the intake port 53a.

The air cleaner 94 can include an air cleaner box 97, an air cleaner element 98 accommodated in the air cleaner box 97, and a second injector 102 for injecting fuel to an entrance opening of the intake pipe 93.

And, in accordance with an embodiment of the invention, the inclination angle of the cylinder 52a can be set such that the cylinder axial line C of the cylinder 52a passes rearward of the motorcycle with respect to a lowermost portion 25b of a seating face 25a of the seat 25 as viewed in a side elevation of the motorcycle as illustrated, for example, in FIGS. 1 and 2.

Further, in accordance with an embodiment of the invention, an inclined wall 54a can be formed on the upper face of the cylinder head cover 54 on the exhaust valve 82 side, as illustrated in FIG. 2. This inclined wall 54a can be disposed so as to be opposed to the rear cushion 41.

Further, in accordance with an embodiment of the invention, the cam 84 can be disposed between a perpendicular L1, which passes the axial center of the main shaft 61 of the change gear 60, and a perpendicular L2, which passes the axial center of the countershaft 62, as viewed in a side elevation of the motorcycle.

As described above, according to an embodiment of the motorcycle 10 of the invention, the cylinder 52a can be inclined rearward, and the connection pipe 91, throttle body 92, intake pipe 93, and air cleaner 94, which are intake system parts, can be disposed forward and upward of the cylinder 52a. Further, the cylinder axial line C of the cylinder 52a can passes rearward of the vehicle with respect to the lowermost portion 25b of the seating face 25a of the seat 25, as viewed in a side elevation of the motorcycle. Therefore, the height of the cylinder head 53 can be made lower, and consequently, lower disposition of the center of gravity of the motorcycle 10 can be achieved. Furthermore, since the seated position and the position of the center of gravity of the engine 50 can be set nearer to each other, concentration of the mass of the motorcycle 10 can be achieved.

Further, according to an embodiment of the motorcycle 10 of the invention, since the inclined wall 54a of the upper face of the cylinder head cover 54 can be disposed in an opposing relationship to the rear cushion 41, the rear cushion 41 and the position of the center of gravity of the engine 50 can be set nearer to each other. Therefore, concentration of the mass of the motorcycle 10 can be achieved further.

Further, according to an embodiment of the motorcycle 10 of the invention, since the engine 50 can be an SOHC engine, whereby the intake valve 81 can be directly driven by the cam 84 and the exhaust valve 82 can be driven by the rocker arm 86, the cylinder head cover 54 on the exhaust valve 82 side can be reduced in size. Consequently, since the cylinder head cover 54 can be positioned further nearer to the rear cushion 41, the rearward inclination angle of the cylinder 52a can be set further greater.

Further, according to an embodiment of the motorcycle 10 of the invention, since the cam 84 can be disposed between the perpendicular L1, which passes the axial center of the main shaft 61, and the perpendicular L2, which passes the axial center of the countershaft 62 of the change gear 60, as viewed in a side elevation of the motorcycle, the change gear 60, cylinder 52a and cylinder head 53 can be closely disposed to each other. Therefore, a further concentration of the mass of the motorcycle 10 can be achieved.

DESCRIPTION OF REFERENCE SYMBOLS

10 Motorcycle
25 Seat
25a Seating face
25b Lowermost portion
41 Rear cushion
50 Engine
51 Crankcase
52 Cylinder block
52a Cylinder
53 Cylinder head
54 Cylinder head cover
54a Inclined wall
60 Change gear
61 Main shaft
62 Countershaft
81 Intake valve
82 Exhaust valve
84 Cam
86 Rocker arm
91 Connecting pipe (intake system part)
92 Throttle body (intake system part)
93 Intake pipe (intake system part)
94 Air cleaner (intake system part)
95 Exhaust pipe (exhaust system part)
96 Muffler (exhaust system part)
WF Front wheel
WR Rear wheel
C Cylinder axial line
L1 Perpendicular line passing axial center of main shaft
L2 Perpendicular line passing axial center of countershaft

We claim:

1. A motorcycle, comprising:
a single-cylinder engine disposed between a front wheel and a rear wheel;
an intake system part connected to a front side of a cylinder of said engine; and
an exhaust system part connected to a rear side of said cylinder,
wherein said cylinder is inclined in the rear of the motorcycle,
wherein said intake system part is disposed forward and upward of said cylinder,
wherein a cylinder axial line of said cylinder passes rearward of the motorcycle with respect to a lowermost portion of a seating face of a seat as viewed in a side elevation of the motorcycle,
wherein an upper face of a cylinder head cover of the cylinder of said engine is arranged facing a rear cushion in an opposing relationship, and
wherein the rear cushion is arranged in an opposing relationship to the upper face of the cylinder head cover.

2. The motorcycle according to claim 1, wherein said engine comprises a single overhead camshaft engine, wherein an intake valve is configured to be directly driven by a cam, and wherein an exhaust valve is configured to be driven by a rocker arm.

3. The motorcycle according to claim 2, wherein said engine further comprises a crankcase configured to accommodate a change gear, and wherein said cam is disposed between a main shaft and a countershaft of said change gear as viewed in a side elevation of the motorcycle.

4. A motorcycle, comprising:
single-cylinder engine means for driving said motorcycle, the engine means being disposed between a front wheel and a rear wheel;
intake system means for receiving air, the intake system means being connected to a front side of a cylinder of said engine means; and
exhaust system means for discharging exhaust, the exhaust system means being connected to a rear side of said cylinder,
wherein said cylinder is inclined rearward,
wherein said intake system means is disposed forward and upward of said cylinder,
wherein a cylinder axial line of said cylinder passes rearward of the motorcycle with respect to a lowermost portion of a seating face of a seat as viewed in a side elevation of the motorcycle,
wherein an upper face of a cylinder head cover of the cylinder of said engine means is arranged facing a rear cushion in an opposing relationship, and
wherein the rear cushion is arranged in an opposing relationship to the upper face of the cylinder head cover.

5. The motorcycle according to claim 4, wherein said engine means comprises a single overhead camshaft engine, wherein an intake valve is configured to be directly driven by a cam, and wherein an exhaust valve is configured to be driven by a rocker arm.

6. The motorcycle according to claim 5, wherein said engine means further comprises a crankcase configured to accommodate a change gear, and wherein said cam is disposed between a main shaft and a countershaft of said change gear as viewed in a side elevation of the motorcycle.

* * * * *